Jan. 16, 1951     L. CHARD     2,538,413
AUTOMATIC POULTRY FEEDER
Filed May 21, 1948     2 Sheets-Sheet 1
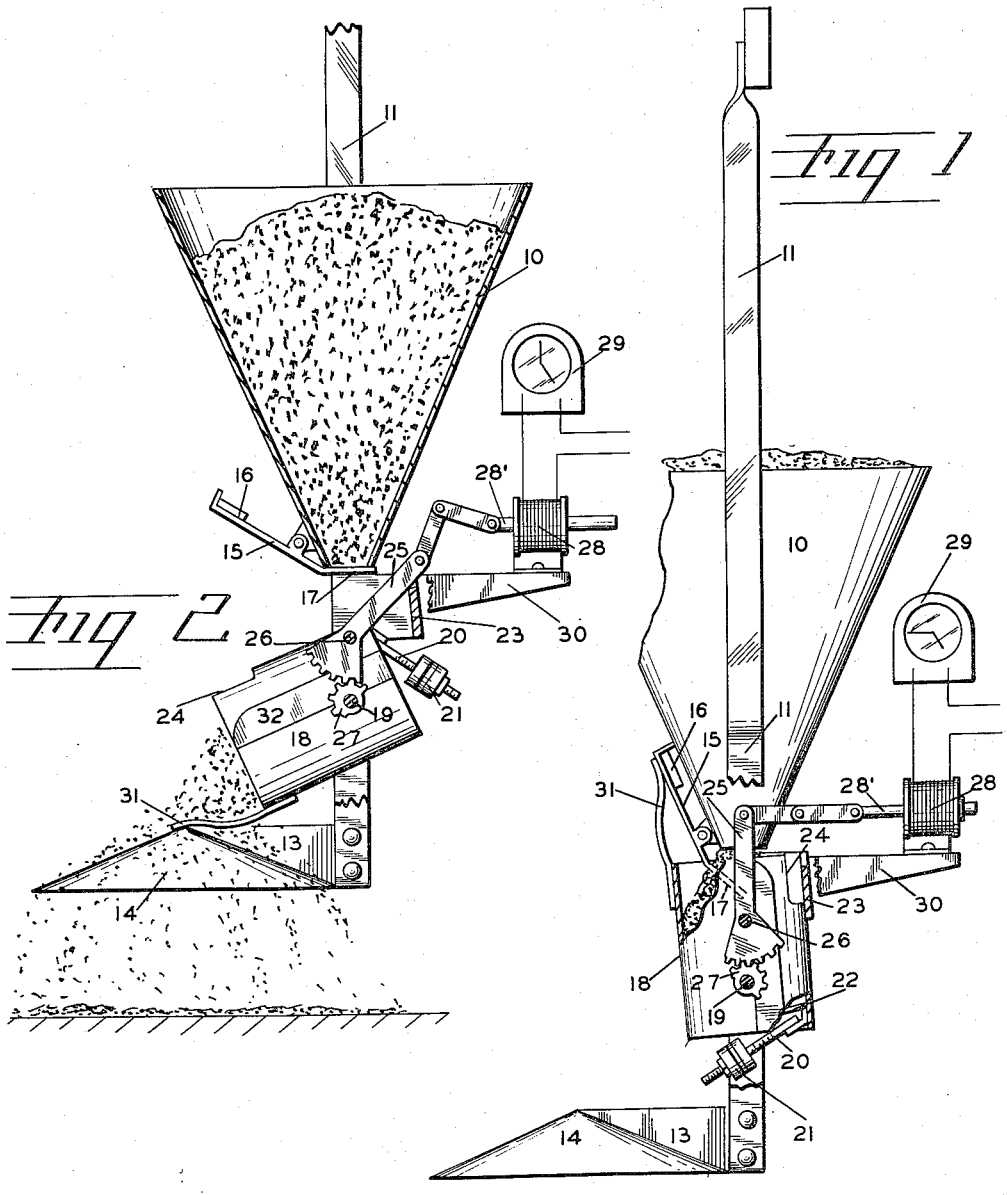
INVENTOR.
LEW CHARD
BY
ATTORNEY Jan. 16, 1951     L. CHARD     2,538,413
AUTOMATIC POULTRY FEEDER
Filed May 21, 1948     2 Sheets-Sheet 2
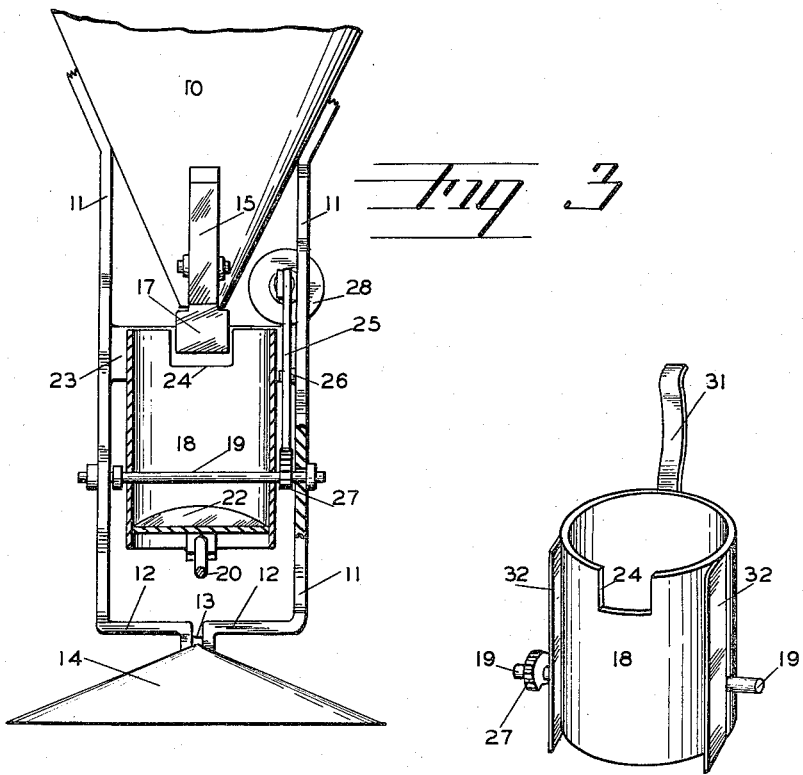
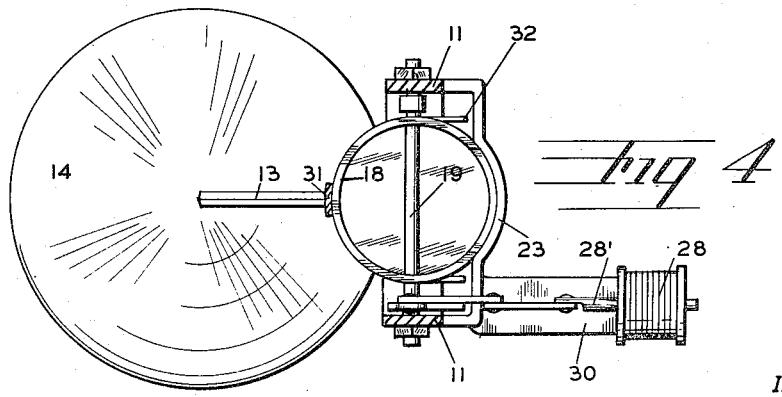
INVENTOR.
LEW CHARD
BY
ATTORNEY Patented Jan. 16, 1951

2,538,413

UNITED STATES PATENT OFFICE 2,538,413

AUTOMATIC POULTRY FEEDER

Lew Chard, Portland, Oreg.

Application May 21, 1948, Serial No. 28,462

3 Claims. (Cl. 161—10)

This invention relates in general to devices designed to deliver predetermined amounts of poultry feed to any location where poultry are accustomed to be fed.

More particularly, the invention relates to automatic means for depositing a specific quantity of dry poultry feed on the ground or on the floor of the chicken house, to enable the proper feeding of the poultry to take place at a predetermined time.

An object of this invention is to provide improved means whereby a predetermined quantity of feed will be sprinkled on the floor of a chicken house, or delivered on to some other customary or suitable feeding place, at predetermined periods.

Another object of this invention is to provide a device, associated with a hopper of any desired size, whereby batches of feed of equal and predetermined amount from the hopper will be distributed at regular and controllable time intervals automatically, and from which no distribution of the feed will occur in between such time intervals.

A further object of this invention is to provide an improved and automatic poultry feeder for delivering equal amounts of feed at predetermined periods, as mentioned, which will be simple in construction, relatively inexpensive to manufacture, and which will require only minimum care and attention in its maintenance and operation.

These objects and other incidental advantages I attain by providing a feed hopper having a feed-measuring receptacle associated therewith, with means automatically controlling the delivery of feed from the hopper into the receptacle and automatically causing the receptacle to empty itself periodically, and by including an electric timing device or electric clock in such means in order that the actuation and operation of the automatic feed will occur at any intervals for which the timing device is set; and finally by constructing and arranging my automatic feeder as hereinafter briefly described with reference to the accompanying drawings.

In the drawings:

Fig. 1 is a side elevation of my automatic poultry feeder with the lower end of the near side supporting strap and with portions of the measuring receptacle shown broken away for the sake of clarity, this figure illustrating the receptacle in a loading or loaded position;

Fig. 2 is a similar side elevation but with the hopper shown in vertical section and illustrating the position of the related parts when the measuring receptacle has been tipped from loaded position to discharging position;

Fig. 3 is an elevation and partial section corresponding to line 3—3 of Fig. 1 but drawn to a slightly larger scale, the measuring receptacle being shown as empty for the sake of clarity;

Fig. 4 is a top plan view of the measuring receptacle and associated members with the hopper removed; and Fig. 5 is a view, in perspective, of the measuring receptacle by itself, entirely removed from the rest of the device, the receptacle being viewed from the right as positioned in Figs. 1 and 4.

A hopper 10, of any desired size, but having its bottom conically shaped, is suspended from a ceiling beam or other overhead support by a pair of metal straps 11 which follow the exterior wall of the hopper at each side for a part of the distance, and then continue downwardly in parallel vertical lines (as shown in Fig. 3), with horizontal converging portions 12 at their lower ends, and terminating in a pair of vertical flanges which are bolted together with a bracket arm 13 secured between them. The bracket arm 13 (shown more clearly in Fig. 1) supports a feed spreader cone 14.

A hopper valve 15 (Fig. 2) is hinged near the bottom or discharging spout of the hopper 10 and comprises a hinged or pivoted arm having a light weight 16 mounted on its outer end and having the other end bent upwardly at a slight angle and enlarged sufficiently to form a small plate 17 of sufficient size to cover the discharging spout of the hopper completely when the valve is in the closed position illustrated in Fig. 2. The weight 16 is merely for the purpose of enabling the valve 15 to swing to the closed position of Fig. 2 against the downward pressure of the feed seeking to pass through the discharging spout of the hopper when the valve is free to do so, and the weight 16 may be entirely dispensed with if the outer portion of the valve arm is made slightly longer.

A measuring receptacle 18, which is preferably, though not necessarily, substantially cylindrical, is rigidly secured on a horizontal shaft 19 which extends diametrically through the receptacle and is located much nearer to the bottom of the receptacle than to the top. The ends of the shaft 19 extend through the two supporting strap members 11 and suitable nuts on each end of the shaft keep the shaft from slipping out of these supports. The shaft is rotatably mounted in these supports.

A counter-weight shaft 20 (Fig. 1) is secured at the bottom of the receptacle 18. The shaft 20 is threaded and counter-weights 21, including a correspondingly threaded securing element, are adjustably mounted on the shaft 20. Preferably the shaft 20 is secured to the receptacle in the position shown in Fig. 1 and the bottom wall 22 of the receptacle preferably slopes slightly upwardly to the rear to allow space beneath the bottom wall at the rear for attaching this shaft 20 and also to facilitate the complete emptying of the receptacle when the receptacle is tipped forwardly as hereinafter explained. The purpose of the counter-weights 21, as will be more apparent later, is to cause the measuring receptacle 18 to tend to assume the upright position illustrated in Fig. 1. The receptacle 18 when in this position rests against a back stop bracket 23, which is shaped as shown in Fig. 4, and the ends of this back stop bracket are welded to, or otherwise rigidly secured to, the strap members 11. A notch 24 is cut in the top of the receptacle wall at the rear to enable the receptacle to tip forwardly without engaging the plate 17 of the hopper valve 15.

A lever arm 25 is pivotally mounted on a pin 26 which extends inwardly from one of the strap members 11. The lower end of this lever arm 25 is broadened and the bottom edge of the same is curved and is provided with gear teeth which are so arranged and positioned as to mesh with the teeth of a partial gear 26 rigidly secured on the receptacle shaft 19 and rigidly secured to the side of the receptacle 18. The opposite or upper end of the lever arm 25 is connected by articulated linkage to the plunger rod 28' of a solenoid 28. The solenoid is mounted on a bracket support 30 which in turn is secured to, or formed integral with, the back stop bracket 23. The circuit to the solenoid is so arranged as to be closed through the intermediary of an electric clock 29, or similar electric control means which can be set to close the circuit to the solenoid for a few seconds at predetermined times. A valve-engaging member 31 is attached to the front of the measuring receptacle 18 and extends upwardly and into engagement with the outer end of the arm of the hopper valve 15 when the receptacle is in the upright position shown in Fig. 1.

The operation of my automatic feeder is as follows: With the measuring receptacle 18 in the normal upright position shown in Fig. 1, the hopper is filled with any suitable dry feed. When the measuring receptacle is in this upright position, the valve-engaging member 31 of the receptacle will press the outer end of the arm of the hopper valve 15 against the side of the hopper, as illustrated in Fig. 1, thus holding the hopper valve open. At the same time the rear side of the measuring receptacle will be resting against the back stop bracket 23.

Since the hopper valve is held open by the receptacle, feed from the hopper will pass down through the discharging spout of the hopper and into the measuring receptacle 18 until the level of feed in the receptacle reaches the hopper discharging spout, whereupon any further passage of the feed from the hopper will cease for the time being. The receptacle 18 is made of such size that when it is filled in this manner the quantity of feed in the receptacle will be the proper amount desired for a single feeding of the poultry. There will be no spilling of the feed from the hopper 10 or from the measuring receptacle 18 as long as the latter remains in this upright position since the top of the receptacle is close to the horizontal plane of the bottom edge of the discharging spout of the hopper and since the back stop bracket 23 prevents any spilling of the feed through the upper rear slot 24 of the receptacle.

The electric time clock or timing control 29 is so set that at the desired time for the feeding to occur the circuit to the solenoid will momentarily be closed by the timing control 29. The timing control 29 is so arranged and constructed that this momentary closing of the circuit to the solenoid will occur not only once but periodically at predetermined desired time intervals, corresponding to the proper feeding times for the poultry.

When the time for a feeding arrives, for which the time control 29 has been set, the control closes the circuit to the solenoid 28 for a few seconds. This momentary energizing of the solenoid will cause the solenoid plunger rod 28' to be moved momentarily to the right, as viewed in Figs. 1 and 2, and this will cause the upper end of the lever arm 25 also to be pulled to the right while the bottom toothed end of this lever arm will move in the opposite direction. As apparent from Fig. 1, such movement of the lever arm 25 will cause the filled measuring receptacle 18 to be tilted forwardly or to the left until the receptacle becomes sufficiently over-balanced to continue tipping to the full discharging position illustrated in Fig. 2, the tipping movement of the receptacle ceasing when the member 31 engages the top of the feed spreader cone 14. When the receptacle is in this position the measured amount of feed from the receptacle is quickly emptied on to the ground or floor, the spreader cone 14 causing the feed to be spread or scattered over a desirable wide area.

As the receptacle 18 tips from the upright position of Fig. 1 to the discharging position of Fig. 2, the hopper valve 15, no longer being held open by the member 31, swings to closed position and thus temporarily prevents further passage of feed from the discharge spout of the hopper. This closing of the hopper valve will not be interfered with by the tipping receptacle 18 since the notch 24 of the receptacle allows for complete clearance of the valve.

Although the tipping of the receptacle 18 and the closing of the hopper valve 15 take place very quickly, a small amount of the feed may escape from the hopper as the valve is closing. In order to direct this additional feed down to the spreader cone 14 also I provide a pair of guide fins 32 on opposite sides of the receptacle 18 respectively, these fins being arranged substantially parallel to the receptacle axis as illustrated. Thus any feed escaping from the hopper and dropping onto the receptacle while the receptacle is in discharging position will slide downwardly along the fin on either side of the receptacle and join the rest of the feed as it is being discharged over the spreader cone 14.

The discharging of the feed from the measuring receptacle 18 of course takes place quickly. If the bottom wall 22 of the receptacle is sloped upwardly, as indicated in Fig. 1, it will be apparent from Fig. 2 that the discharging of the entire contents of the receptacle will be facilitated.

As soon as the receptacle 18 has emptied itself and thus been relieved of the weight of the feed in the receptacle, the counter weights 21 will cause the receptacle to swing back again to the upright position. Since the closing of the circuit to the solenoid by the time control 29 lasts for only a few seconds the lever arm 25, plunger rod 28' and connecting linkage, are free to return to their normal positions. As the receptacle swings back to its upright position the member 31 contacts the the outer end of the arm of the hopper valve 15, overcoming the slight over-balancing of the valve arm, and thus again opening the hopper valve and holding it open as long as the receptacle remains in upright position. The measuring receptacle is again quickly filled with feed from the hopper and the device then remains inactive until such time as the electric control 29 again momentarily causes the solenoid to become energized, whereupon the cycle is repeated.

Thus, depending upon the electric time control 29 and upon the size of the hopper 10, the delivery, at the desired moment, of a measured quantity of feed can be made to occur not only once but at repeated intervals. This is a novel and important feature of my invention.

Various modifications could be made in the parts and details of construction in the apparatus which I have illustrated and described for the carrying out of my invention and without departing from the principle of the invention. The apparatus as illustrated I have found to be very satisfactory in accomplishing the particular objects of my invention and, because of its simplicity, I regard this as the preferred form for my automatic poultry feeder. Nevertheless it is not my intention to limit my invention specifically to the construction described or otherwise to restrict the invention except as set forth in the claims.

I claim:

1. In an automatic poultry feeder, a feed hopper, a bottom outlet from said hopper, a self-closing valve on said hopper for shutting off the discharge of feed from said outlet, means adapted normally to close said valve, a measuring receptacle positioned below said hopper, said receptacle mounted to swing on a horizontal axis from upright filling position to tilted discharging position, a member on said receptacle adapted to engage said hopper valve and open said valve when said receptacle is in upright filling position, but permitting said valve to close by moving out of engagement with said hopper valve when said receptacle moves to discharging position, said receptacle being located sufficiently close to said hopper outlet so that the filling of said receptacle, when said receptacle is in upright filling position, will temporarily block further discharge of feed from said hopper, and electrical means for momentarily and periodically causing said receptacle to move to discharging position.

2. In an automatic poultry feeder of the character described, a feed hopper, means for supporting said hopper, a discharging spout for said hopper, a self-closing valve on said hopper for shutting off the discharge of feed from said spout, means adapted normally to close said valve, a measuring receptacle pivotally mounted below said spout, said receptacle mounted to swing on a horizontal axis from upright filling position to tilted discharging position, said receptacle being so mounted and weighted that it will always resume upright position when empty, an arm on said receptacle adapted to engage said hopper valve and open said valve when said receptacle is in upright filling position, but permitting said valve to close by moving out of engagement with said hopper valve when said receptacle moves to discharging position, said receptacle being located sufficiently close to said hopper spout so that the filling of said receptacle, when said receptacle is in upright filling position, will temporarily block further discharge of feed from said hopper, and electrical means for momentarily and periodically causing said receptacle to move to discharging position.

3. An automatic poultry feeder of the character described including a feed hopper, means for suspending said hopper, a bottom outlet from said hopper, a self-closing valve on the bottom of said hopper for shutting off the discharge of feed from said outlet, a weighted arm adapted normally to close said valve, a measuring receptacle pivotally mounted below said outlet, said receptacle mounted to swing on a horizontal axis from upright filling position to tilted discharging position, said receptacle being so mounted and weighted that it will always resume upright position when empty, a member on said receptacle adapted to engage the weighted arm of said hopper valve and open said valve when said receptacle is in upright filling position, but permitting said valve to close by moving out of engagement with said weighted arm of said hopper valve when said receptacle moves to discharging position, said receptacle being located sufficiently close to said hopper outlet so that the filling of said receptacle, when said receptacle is in upright filling position, will temporarily block further discharge of feed from said hopper, and electrical means for momentarily and periodically causing said receptacle to move to discharging position.

LEW CHARD.

REFERENCES CITED

The following references are of record in the file of this patent:

UNITED STATES PATENTS

| Number | Name | Date |
|---|---|---|
| 779,434 | Lyon | Jan. 10, 1905 |
| 1,175,788 | Martin | Mar. 14, 1916 |
| 1,364,003 | Smith | Dec. 28, 1920 |
| 1,503,335 | Rose | July 29, 1924 |
| 2,319,795 | Coffin | May 25, 1943 |